United States Patent [19]
Corsaro

[11] Patent Number: 5,794,999
[45] Date of Patent: Aug. 18, 1998

[54] PIZZA BOX CARRIER

[76] Inventor: Luigi Corsaro, 5 Webster Pl., Edison, N.J. 08817

[21] Appl. No.: 799,706

[22] Filed: Feb. 11, 1997

[51] Int. Cl.⁶ ....................................................... B65G 7/12
[52] U.S. Cl. ........................................... 294/16; 294/28
[58] Field of Search ............................ 294/16, 28, 31.1, 294/32, 62, 106, 161, 164, 169

[56] References Cited

U.S. PATENT DOCUMENTS

| | | | |
|---|---|---|---|
| 1,014,079 | 1/1912 | McKay et al. | 294/62 |
| 1,249,723 | 12/1917 | Danielson | 294/62 |
| 2,349,531 | 5/1944 | Weir | 294/31.1 X |
| 2,768,017 | 10/1956 | Johnson | 294/28 X |
| 3,061,350 | 10/1962 | Miller | 294/16 |
| 3,262,728 | 7/1966 | Atterbury | 294/16 |
| 3,436,112 | 4/1969 | Pasquine | 294/62 |
| 3,575,455 | 4/1971 | Bloch | 294/16 X |
| 4,109,952 | 8/1978 | Monzain | 294/16 |

Primary Examiner—Johnny D. Cherry
Attorney, Agent, or Firm—Ezra Sutton

[57] ABSTRACT

A box carrier for carrying a plurality of formed and stacked boxes, the boxes having side walls and covers, including a handle assembly having a handle member, a pair of pivotally mounted horizontal members, a pair of pivot members and a cross bar for lifting and carrying, and for opening and closing the box carrier on a plurality of formed and stacked boxes. Each of the horizontal members is connected at one end to the handle member and at the other end is connected to one of the pivot members, and the pivot members are connected to the cross bar. The box carrier further includes a pair of vertical arm members connected at their upper ends to the pivot members for moving the vertical arms to an outward position or an inward position. In addition, the box carrier also includes a pair of horizontal carry arm members, such that the vertical arms members at their lower ends are connected to the pair of horizontal carry arm members for holding the side walls of a box.

3 Claims, 4 Drawing Sheets

PIZZA BOX CARRIER

FIELD OF THE INVENTION

This invention relates to an improved box carrier for use in carrying multiple stacked boxes. More particularly, it relates to a pizza box carrier for carrying multiple stacked pizza boxes having hot pizza's therein, without the user's hands being in contact with the hot pizza boxes.

BACKGROUND OF THE INVENTION

Carrying devices for jars, bottles, cans, cooking pots, pans, kettles, crates, boxes and the like are well known in the prior art. All of these prior art inventions relate to giving the user the ability to lift and carry multiple units (i.e., jars, bottles, and crates), or to lift and carry an extremely hot item (i.e. mason jars, a cooking kettle); or to lift and carry an extremely fragile item (i.e., egg crates filled with eggs).

In using these prior art devices for carrying crates, boxes, cartons and the like, it has been found that these aforementioned devices are clumsy is use, overly complex in structure, and mechanically complicated in design of their component parts, such that the user does not save time and is not provided with adequate convenience when using such devices to perform their specific functions.

There remains a need for a pizza box carrier for carrying multiple stacked pizza boxes having hot pizzas therein, having a simple mechanical design where the user's hands do not come in contact with the hot pizza boxes while carrying them for a delivery to a customer.

DESCRIPTION OF THE PRIOR ART

Carrying devices for jars, bottles, cans, cooking pots, pans, kettles, crates, and boxes having various designs, structure, configurations and materials of construction have been disclosed in the prior art. For example, U.S. Pat. No. 246,120 to Goodyear discloses a jar carrier for handling and carrying of jars, bottles, and the like, safely and conveniently. When in use, the jar is grasped when the ring E is drawn upwardly by means of the handle F, and this ring E forces the lower ends D of the wires A apart from each other, so that the frame formed by the wires A and ring E can be passed over a jar J. The ring E is then forced downwardly by means of the handle F, whereby the lower hooked or bent ends D of wires A are pressed toward each other and under the bottom of the jar J, which they support. The jar J is thus held firmly and cannot drop from the frame, and the wires A and G protect the jar from damage and/or breakage. This prior art patent does not disclose the particular structure or the mechanism for operation of the pizza box carrier of the present invention.

U.S. Pat. No. 1,397,345 to Szmyd discloses an utensil implement for carrying about cooking pots, bottles and the like which eliminates the inconvenience and danger associated with carrying such utensils by the user's hands. When in use, the sleeve is moved all the way down against the ears causing the jaws to separate. The jaws are then placed about opposite edges of the pot to be lifted. Then the sleeve is raised toward the handle, closing the jaws around the pot. By placing the handle in the palm of the user's hand, and gripping the sleeve and hub by the user's fingers, the pot may be carried in one hand. This prior art patent does not disclose the particular structure or mechanism for operation of the pizza box carrier of the present invention.

U.S. Pat. No. 1,716,849 to Culp discloses a can lifter device comprising a slidable handle member having its arms slidably mounted in the ends of a cross bar and connected to transverse members slidably mounted on arms of can gripping jaws. The jaws may be forced towards each other for gripping the can or away from each other for releasing the can. The lower ends of the jaws include horizontal members having sharpened edges which are used to force under a can or to grip the upper end of the can thereof. This prior art patent does not disclose the structure or the mechanism for operation for the pizza box carrier of the present invention.

U.S. Pat. No. 2,049,568 to Martin discloses an egg case carrier for engaging an egg case so that the carrier will not crush the egg case. This prior art patent does not disclose the structure or the mechanism for operation for the pizza box carrier of the present invention.

None of the aforementioned prior art patents teach or disclose the structure or configuration of a box carrier having an operational mechanism which is simple in mechanical design for carrying multiple pizza boxes by a user, as in the present invention.

Accordingly, it is an object of the present invention to provide a pizza box carrier for the lifting and carrying of multiple stacked pizza boxes having hot pizzas therein.

Another object of the present invention is to provide a pizza box carrier of a simple mechanical design and lightweight structure, such that the user's hand(s) do not come in contact with the hot pizza boxes while carrying them for delivery to a customer.

Another object of the present invention is to provide a pizza box carrier having a simple design configuration of an inverted U-shaped frame including a set of vertical arms with inwardly projecting jaws on their lower ends for grasping the pizza boxes for carrying, and having a handle mechanism for easily actuating the vertical arms toward and away from each other.

A further object of the present invention is to provide a pizza box carrier that can be mass produced in an automated and economical manner, that is easy to use by the carrier, and is readily affordable by the user.

SUMMARY OF THE INVENTION

In accordance with the present invention, there is provided a box carrier for carrying a plurality of formed and stacked boxes, the boxes having side walls and covers, including a handle assembly having a handle member, a pair of pivotally mounted horizontal members, a pair of pivot members and a cross bar for lifting and carrying, and for opening and closing the box carrier on a plurality of formed and stacked boxes. Each of the horizontal members is connected at one end to the handle member and at the other end is connected to one of the pivot members, and the pivot members are connected to the cross bar.

The box carrier further includes a pair of vertical arm members connected at their upper ends to the pivot members for moving the vertical arms to an outward position or an inward position. In addition, the box carrier also includes a pair of horizontal carry arm members, such that the vertical arms members at their lower ends are connected to the pair of horizontal carry arm members for holding the side walls of a box.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

Figure 1:
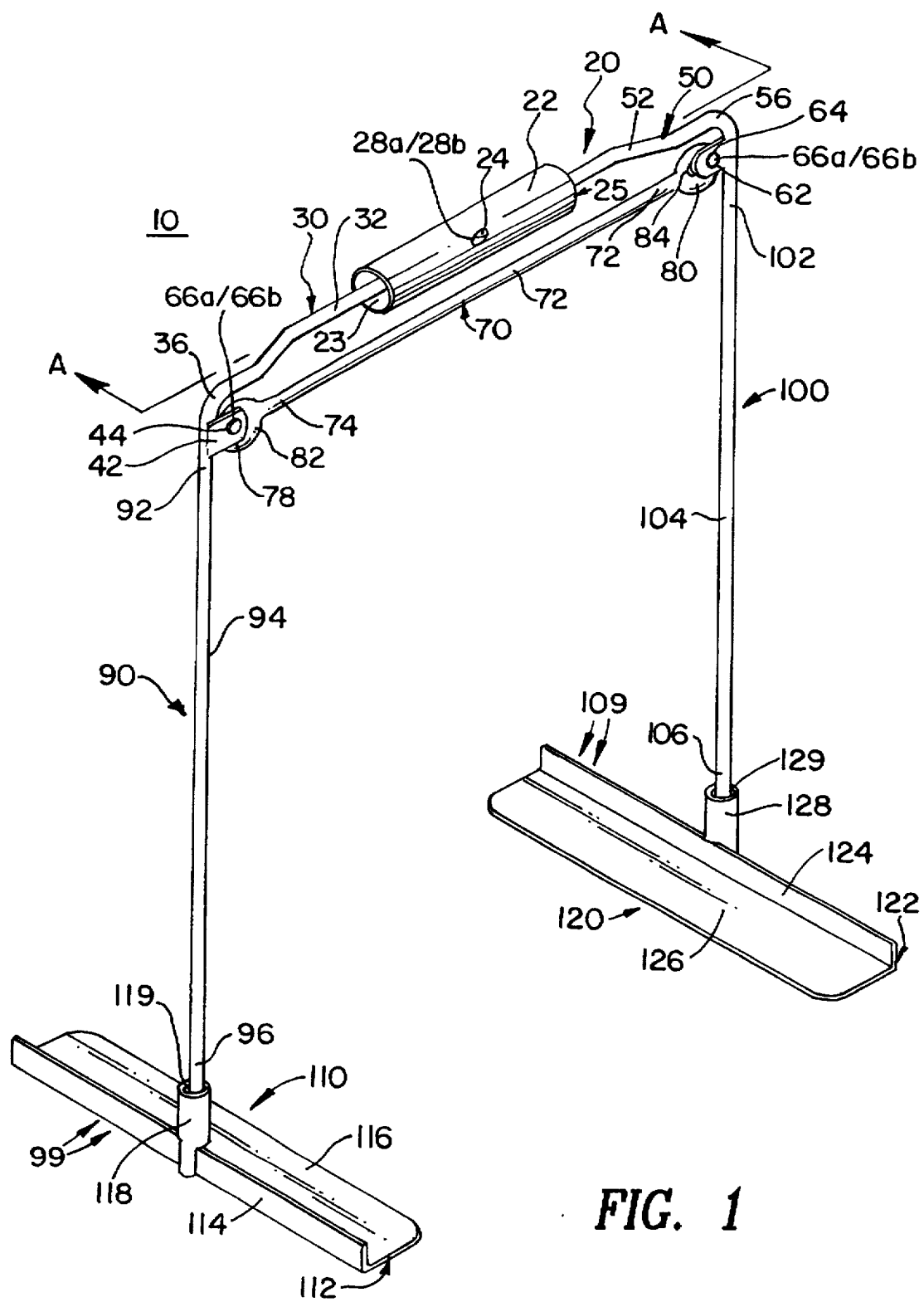
FIG. 1 is a perspective view of the pizza box carrier of the preferred embodiment of the present invention showing the major component parts contained therein.

The pizza box carrier 10 and its component parts of the preferred embodiment of the present invention are represented in detail by FIGS. 1 through 5. The pizza box carrier 10, as shown in FIG. 1, includes a handle assembly 20 for lifting and carrying a plurality of formed and stacked pizza boxes 12; a pair of vertical arms 90 and 100 that move to outward positions 98 and 108 for opening the pizza box carrier 10 or move to inward positions 99 and 109 for closing the pizza box carrier 10; and a pair of horizontal carry arm members 110 and 120 for holding the side walls 14L and 14R and bottom wall 14B of the bottommost pizza box 12B. Box carrier 10 can be made of a durable plastic, steel, stainless steel or aluminum.

Figure 3:
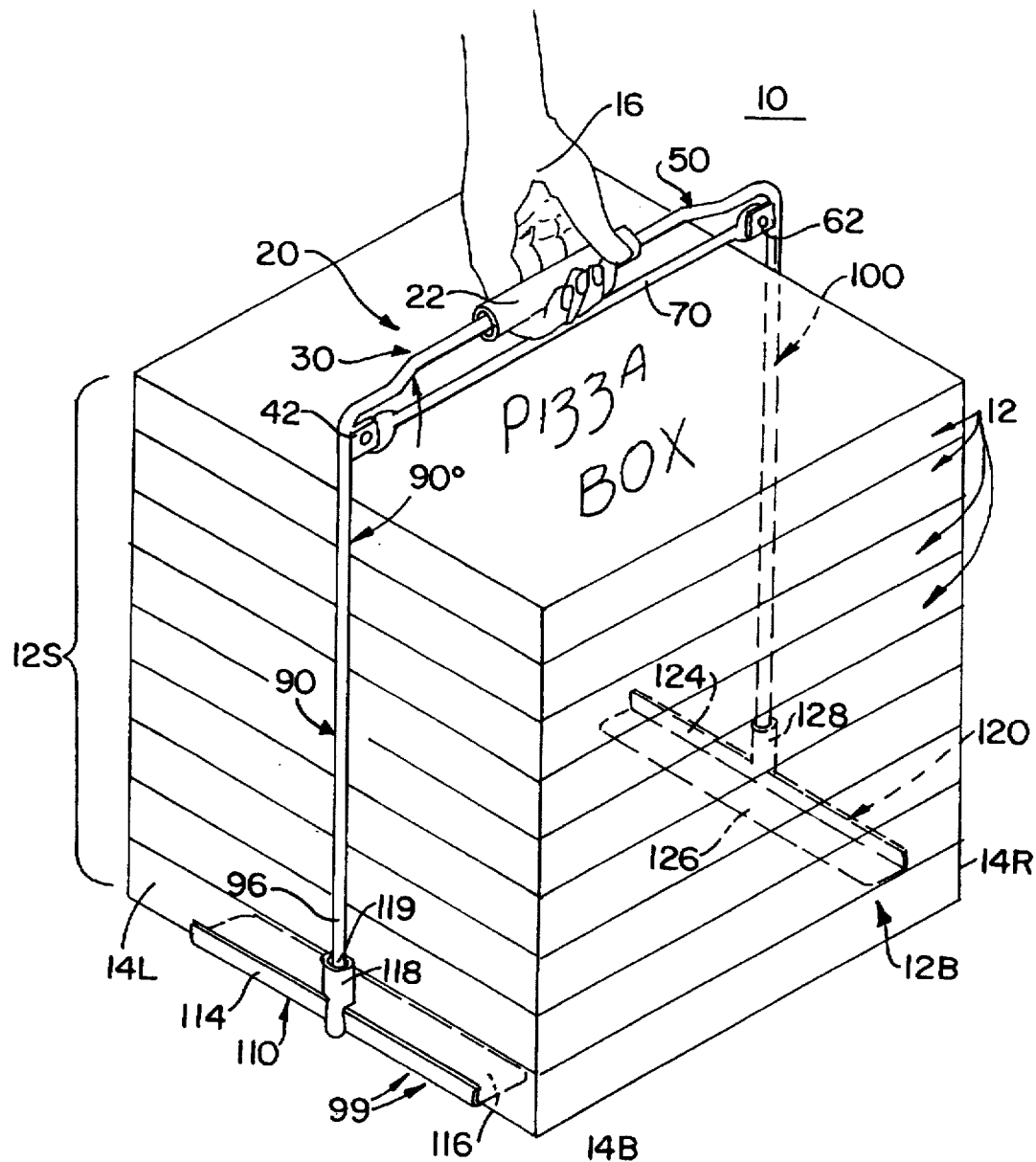
FIG. 3 is a perspective view of the pizza box carrier of the preferred embodiment of the present invention showing the major component parts contained therein; and in operational use being in a closed position.
Figure 4A:
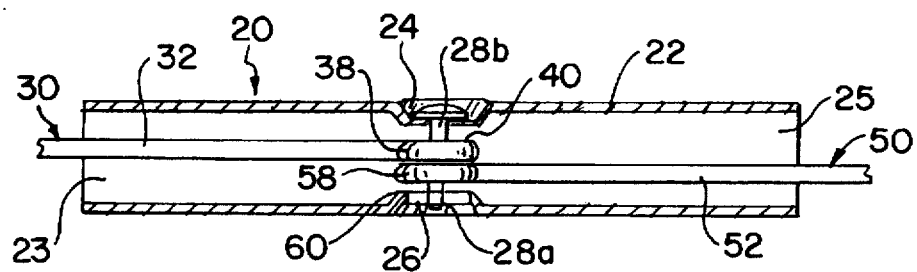
FIG. 4a is a cross-sectional view of the pizza box carrier of the present invention taken along lines A—A of FIG. 1 showing the handle member and horizontal members being connected by a nut and bolt.
Figure 4B:
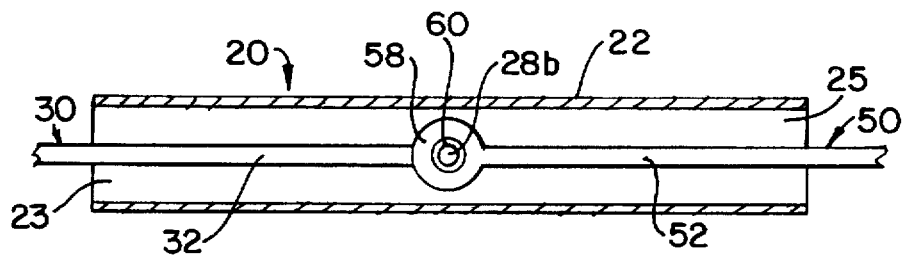
FIG. 4b is a cross-sectional view of the pizza box carrier of the present invention taken along lines B—B of FIG. 2 showing the handle member, horizontal members and connecting means.

The handle assembly 20 includes a hollow handle member 22 having end openings 23 and 25 and a pair of recessed circular hole openings 24 and 26 being 180° degrees opposed to each other, as shown in FIG. 4a of the drawings, for receiving a nut 28a and bolt 28b. Handle assembly 20 further includes a pair of pivotally mounted horizontal members 30 and 50. Horizontal members 30 and 50 include shaft components 32 and 52 each having first connecting ends 34 and 54 and second connecting ends 36 and 56. The first connecting ends 34 and 54 have integrally attached shaft attachment rings 38 and 58 with shaft openings 40 and 60 for receiving nut 28a and bolt 28b of handle member 22, as shown in FIG. 4a of the drawings. The second connecting ends 36 and 56 have integrally attached pivot members 42 and 62 with pivot member openings 44 and 64. Pivot members 42 and 62 are connected to a rigid cross bar 70, as shown in FIGS. 1, 2, and 3 of the drawings.

Cross-bar 70 includes a shaft section 72 having at each end 74 and 76 integrally attached shaft attachment rings 78 and 80 with shaft openings 82 and 84. Cross-bar 70 is attached to pivot members 42 and 62 by joining the shaft attachment rings 78 and 80 of cross-bar 70 to that of the pivot members 42 and 62, such that pivot member openings 44 and 64 of pivot members 42 and 62 are aligned with shaft openings 82 and 84 of cross-bar 70 and each are held together by a nut and bolt 66a and 66b, as shown in FIGS. 1, 2, and 3 of the drawings.

Figure 2:
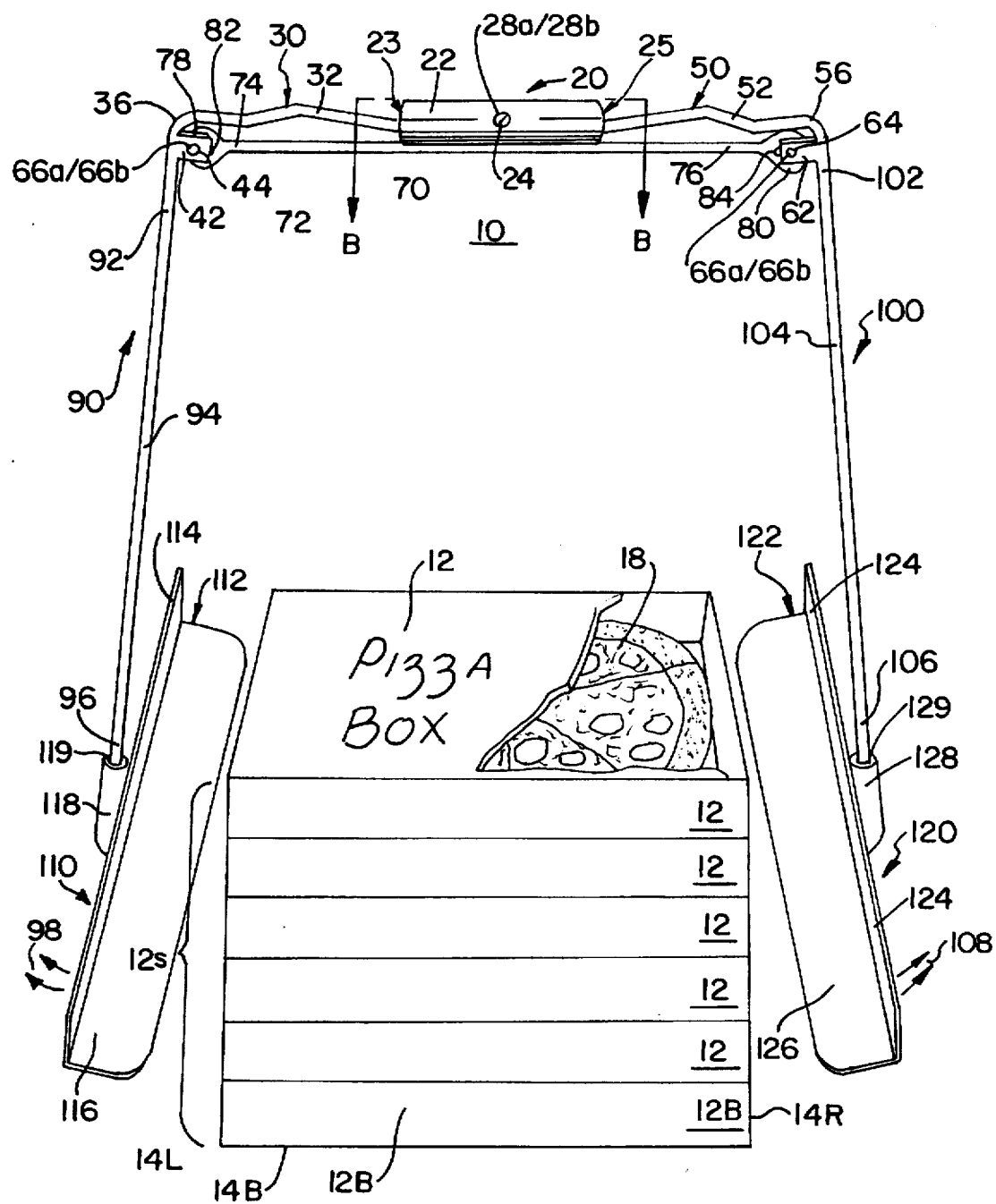
FIG. 2 is a front perspective view of the pizza box carrier of the preferred embodiment of the present invention showing the major component parts contained therein; and in operational use being in an opened position.

Vertical arms 90 and 100 are integrally connected at their respective upper ends 92 and 102 to each pivot member 42 and 62 and each horizontal member 30 and 50, respectively, as shown in FIGS. 1 to 3 of the drawings. Vertical arms 90 and 100 include upper ends 92 and 102, shaft sections 94 and 104, and lower ends 96 and 106 for receiving horizontal carry arm members 110 and 120. Vertical arms 90 and 100 are positioned at a 90° angle from their respective horizontal members 30 and 50, respectively.

Horizontal carry arm members 110 and 120 each include an L-shaped component 112 and 122 having side walls 114 and 124 and an integrally attached bottom wall 116 and 126, as shown in FIGS. 1, 2, and 3 of the drawings. Each side wall 114 and 124 includes centrally attached connecting posts 118 and 128 having a recessed opening 119 and 129 for receiving and holding in place each lower end 96 and 106 of vertical arms 90 and 100, respectively.

Figure 5:
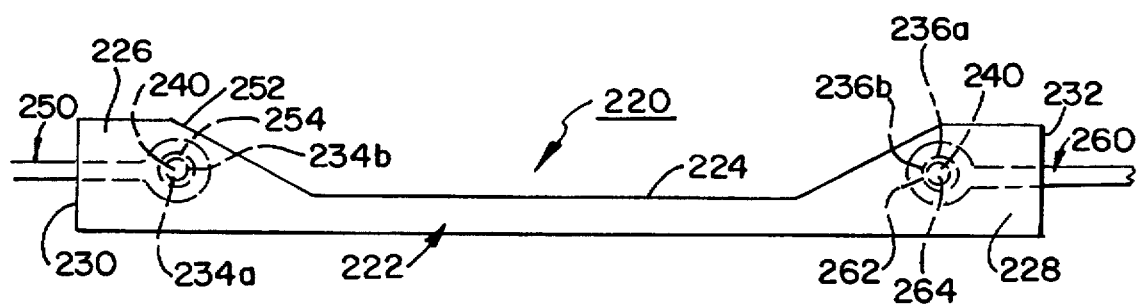
FIG. 5 is a side elevational view of the pizza box carrier of the present invention showing an alternate handle assembly configuration.

The present invention of pizza box carrier 10 includes an alternate handle assembly 220 having a (different configuration for) handle member 222 and having shorter horizontal members 250 and 260. In all other respects handle assembly 220 functions and operates in the same manner as handle assembly 20 for the pizza box carrier 10 of the preferred embodiment of the present invention, as depicted in FIG. 5 of the drawings. Handle member 222 includes a gripping section 224 having a pair of hand-receiving cavity members 226 and 228 with oval openings 230 and 232 in order to receive shaft attachment rings 252 and 262 of horizontal members 250 and 260. Shaft attachment rings 252 and 262 have shaft openings 254 and 264 for receiving a metal rivet 240. Handle receiving cavity members 226 and 228 further include a pair of circular hole openings 234a, 234b, 236a, and 236b within each cavity member 226 and 228. In connecting handle member 222 to horizontal members 250 and 260, the shaft openings 254 and 264 from shaft attachment rings 252 and 262 are aligned with hole openings 234a and 234b of cavity member 226 and hole openings 236a and 236b of cavity member 228, respectively, such that rivets 240 are inserted into hole openings 234a, 254, and 234b and into hole openings 236a, 264, and 236b, respectively. This sequence attaches and connects the handle-receiving cavity members 226 and 228 of handle member 222 to the shaft attachment rings 252 and 262 of horizontal members 250 and 260 via rivets 240 for forming the alternate handle assembly 220 of the present invention, as depicted in FIG. 5 of the drawings.

OPERATION OF THE PRESENT INVENTION

In operation, the user actuates the pizza box carrier 10 from a closed position 99 and 109, as shown in FIG. 1 of the drawings, to an opened position 98 and 108, as shown in FIG. 2 of the drawings, in which to receive a plurality of formed and stack pizza boxes 12S. To move the pizza box carrier 10 from a closed position 99 and 109 to an opened position 98 and 108, the user places his/her hand 16 around both the handle member 22 or 222 and the cross-bar member 70 of handle assembly 20 or 220 and then squeezes both handle member 22 or 222 and cross-bar 70 together, such that handle member 22 or 222 is adjacent to and engaging cross-bar 70, as shown in FIG. 2 of the drawings. This movement to the open position 98 and 108 is caused by moving pivot members 42 and 62 and vertical arms 90 and 110 in an outward direction, as the handle member 22 or 222 and cross-bar 70 are squeezed together.

The opened box carrier 10 is then placed over a plurality of formed and stacked pizza boxes 12S having hot pizzas 18 therein, as shown in FIG. 2 of the drawings. The user then positions the box carrier 10, such that the vertical arms 90 and 100 are centrally located relative to the side walls 14L and 14R of stacked pizza boxes 12S. The user then gently pulls upwardly on the handle member 22 or 222 only of handle assembly 20 or 220, such that the side walls 114 and 124 and bottom walls 116 and 118 of the horizontal carry arm members 110 and 120, respectively, engage the bottommost pizza box 12B on its side walls 14L and 14R and bottom wall 14B, as depicted in FIG. 3 of the drawings. The upward motion by the user's hand 16 actuates and moves the pivot members 42 and 62 and vertical arms 90 and 110 in an inward direction, thereby closing the carry arm members 110 and 120, respectively, on the side walls 14L and 14R and bottom wall 14B of the bottommost pizza box 12B.

The user then lifts the handle member 22 or 222 by the user's hand 16 and carries the loaded pizza box carrier 10 having a plurality of pizza boxes 12S to a motor vehicle for transport to a customer or group of customers. The box carrier 10 can be made into a variety of sizes for holding small, medium, or large pizza boxes 12.

ADVANTAGES OF THE PRESENT INVENTION

Accordingly, an advantage of the present invention is that it provides for a pizza box carrier for the lifting and carrying of multiple stacked pizza boxes having hot pizzas therein.

Another advantage of the present invention is that it provides for a pizza box carrier of a simple mechanical design and light-weight structure, such that the user's hand (s) do not come in contact with the hot pizza boxes while carrying them for delivery to a customer.

Another advantage of the present invention is that it provides for a pizza box carrier having a simple design configuration of an inverted U-shaped frame including a set of vertical arms with inwardly projecting jaws on their lower ends for grasping the pizza boxes for carrying, and having a handle mechanism for easily actuating the vertical arms toward and away from each other.

A further advantage of the present invention is that it provides for a pizza box carrier that can be mass produced in an automated and economical manner, that is easy to use by the carrier, and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A box carrier for carrying a stack of boxes which includes a plurality of formed and stacked boxes, said boxes having side walls and covers, comprising:
   a) a handle assembly for carrying said stack of boxes including a handle member, a pair of pivotally mounted horizontal members being pivotally connected to said handle member, a pair of pivot members and a cross bar;
   b) each of said horizontal members being pivotally connected at one end to said handle member by attachment rings and at the other end connected to one of said pivot members; said pivot members being connected to said cross bar; said attachment rings being pivotally mounted on a cross member connected to said handle member;
   c) a pair of vertical arm members connected at their upper ends to said pivot members of said handle assembly; said handle assembly being operable for moving said vertical arm members between a gripping position and a non-gripping position; and
   d) a pair of horizontal carry arm members; said vertical arm members at their lower ends being connected respectively to said pair of horizontal carry arm members for engaging and holding the bottommost box of the stack; so that when said handle member and said crossbar are moved together said vertical arm members move about said pivot members to a non-gripping position; and when said handle member is pulled upwardly, said vertical arm members move about said pivot members to a gripping position.

2. A box carrier in accordance with claim 1, wherein said box carrier is made of materials selected from the group consisting of durable plastic, stainless steel, steel, and aluminum.

3. A box carrier in accordance with claim 1, wherein each of said carry arm members is of an L-shaped configuration having a sidewall and a bottom wall for engaging the box sidewall and box bottom wall of said bottommost box of said stack of boxes.

* * * * *